United States Patent Office 3,021,089
Patented Feb. 13, 1962

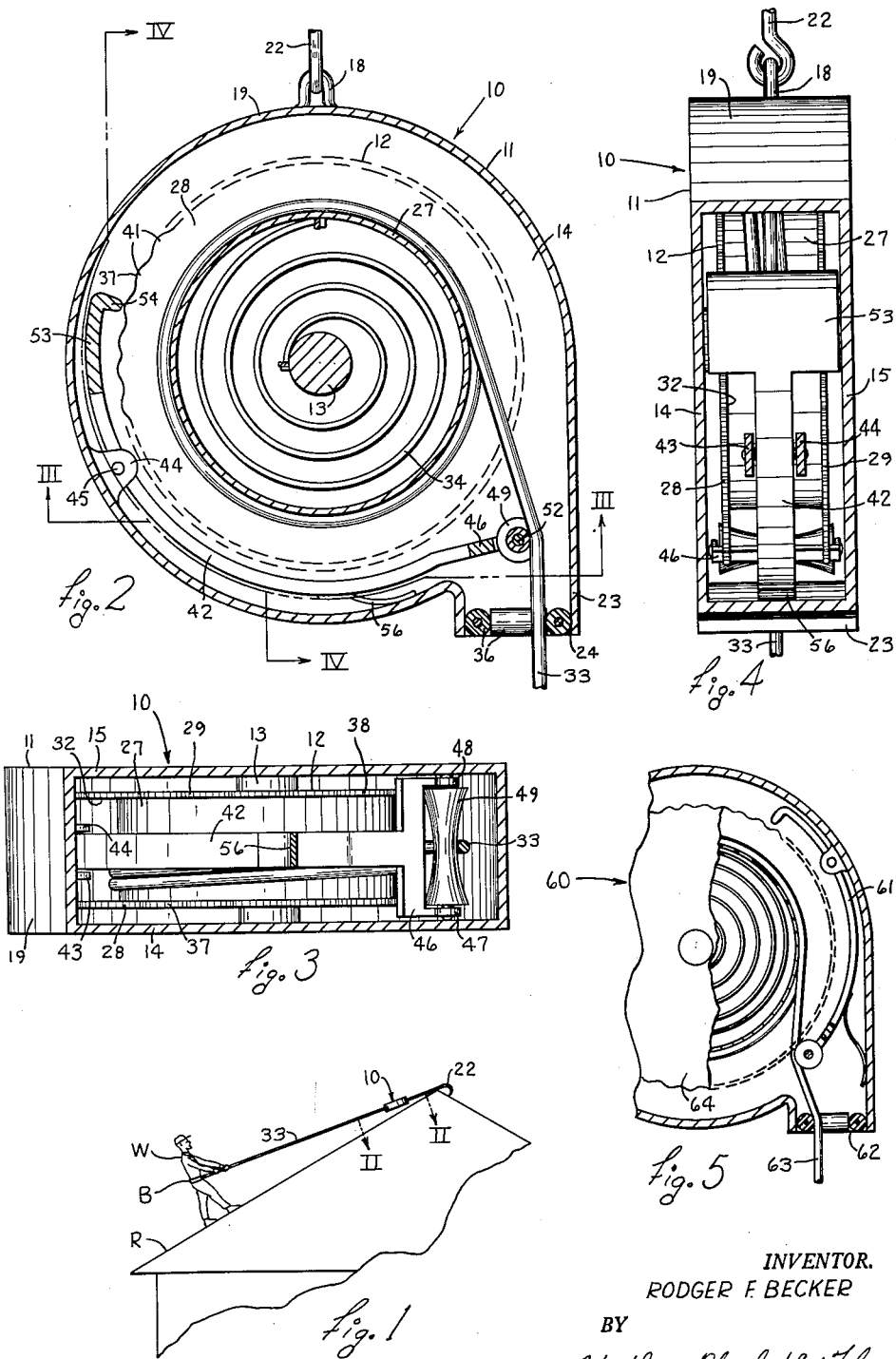

3,021,089
SAFETY ARM FOR CORD REEL
Rodger F. Becker, Kalamazoo, Mich., assignor to Aero-Motive Manufacturing Company, Kalamazoo, Mich., a corporation of Michigan
Filed Jan. 4, 1960, Ser. No. 88
4 Claims. (Cl. 242—107.3)

This invention relates in general to a cord reel having a spring-biased, cord-supporting drum rotatably supported within a casing and, more particularly, to a type thereof having a safety or locking arm pivotably supported within the casing and engageable with the cord drum for positively opposing rotation thereof in response to an abrupt movement, or a substantial acceleration in the movement, of the cord away from the cord reel.

A serious need has long existed for a safety device which can be used by men working on scaffolding, roofs or other high places whereby such men can be protected against a serious fall from such high places without interfering with their normal work activities. Safety devices previously developed and intended for this purpose have not been widely used for a variety of reasons. In the first place, existing safety devices in order to be effective usually require frequent, manual adjustment as the workman changes his position. For example, where safety belts, anchor ropes and the like are used, they must usually be untied and tied or disconnected and connected each time the workman moves to a new position. As a result, workmen often ignore the safety device whenever they feel that that they can risk the chance of falling.

In the second place, said existing safety devices for this purpose usually require special attachments or long, uncontrolled elements which become tangled, if they are not properly stowed, even when in use. In the third place, existing safety devices are often connected to the same, sometimes unstable, structure which supports the workman. Thus, although the safety device is capable of protecting the workman against falling from the support structure, it is incapable of protecting the workman in the event that the entire structure collapses. This condition arises particularly where the workman is supported upon temporary scaffolding.

The particular embodiment of the invention described hereinafter was developed out of the need for a safety device to be used for the protection of workmen. Accordingly, some of the language utilized herein may be specific to such a use. However, it will be understood that such specific reference is for convenience and illustrative purposes only, and is not intended to limit the scope of the invention.

In studying this problem, it occurred to me that certain characteristics of various spring-biased cord reels could be modified and combined with additional structure to provide a safety device suited to this particular purpose. Cord reels have for many years been used to take up the slack in various types of extendable cords, cables and the like for a variety of different purposes. These reels are often provided with drum-locking devices which can be actuated in a variety of different ways to lock the drum so that no additional cord can be unwound from the reel until the lock is released. However, such a lock would not be applicable here because, once the lock is released, there is no way to prevent the complete unwinding of the drum while the unwinding force is being applied to the cord.

Spring-biased cord reels have been used to support loads so that the load can be easily raised by applying thereto a relatively small force. However, in this type of reel the drum spring is of such strength that it usually requires a considerable amount of force to unwind the cord from the drum unless the load is suspended directly by the cord. Thus, no reel to my knowledge has been devised wherein the cable can be easily removed from and rewound by the reel, but wherein such removal can be stopped substantially immediately when a condition arises which necessitates such stopping.

Accordingly, a primary object of this invention has been the provision of a safety device comprising an improved, modified cord reel assembly which can be attached to a workman and anchored upon a completely sound structure for the purpose of positively preventing the workman from taking a serious fall, and which does not interfere with the normal movements of the workman in conducting his work.

A further object of this invention has been the provision of a cord reel assembly, as aforesaid, having a spring-biased, cord-supporting drum rotatably supported within a casing and equipped with locking mechanism whereby an abrupt movement, or a sudden and substantial acceleration in the movement, of the cord away from the cord reel casing will cause said mechanism to oppose rotation of the drum and thereby arrest said movement of the cable from the drum.

A further object of this invention is the provision of a cord reel assembly, as aforesaid, wherein the locking mechanism is simple, sturdy and reliable in construction, foolproof in its operation, and can be applied to existing types of cord reel structures without material if any modification in the structure thereof.

A further object of this invention has been the provision of a cord reel assembly, as aforesaid, wherein the locking mechanism can be completely contained within the reel casing so that it does not interfere with or detract from the exterior appearance or shape of the cord reel assembly.

Other objects and purposes of this invention will become apparent to persons familiar with this type of equipment upon reading the following specification and examining the accompanying drawings, in which:

FIGURE 1 is a broken, side elevational view of a roof structure illustrating a practical application of a cord reel embodying the invention.

FIGURE 2 is a sectional view of said cord reel substantially as taken along the line II—II in FIGURE 1.

FIGURE 3 is a sectional view taken along the line III—III in FIGURE 2.

FIGURE 4 is a sectional view taken along the line IV—IV in FIGURE 2.

FIGURE 5 is a broken fragment of a cord reel assembly showing a modified embodiment of the invention.

For convenience in description, the terms "upper," "lower," and derivatives thereof and words of similar import will have reference to the cord reel assembly embodying the invention as appearing in FIGURES 2, 4 and 5. The terms "inner," "outer," derivatives thereof and words of similar import will have reference to the geometric center of said cord reel assembly and parts thereof.

*General description*

The objects and purposes of the invention, including those set forth above, have been met by providing a cord reel assembly comprising a casing, a spring-biased, cord-supported within said casing and a locking arm mounted within said casing and engageable near opposite ends with the cord drum and the cord supported thereon. Said locking arm is disposed so that it is forced into engagement with an irregular surface on the cord drum to oppose rotation thereof in response to an abrupt movement, or a sudden and substantial acceleration in the movement, of the cord away from the cord reel assembly. Accordingly, the drum lock arm is actuated to arrest rotation of the drum only when the cord is unwound from the cord reel drum at a rate of speed or rate of acceleration which exceeds a predetermined or selected value. That is, a rapid acceleration in the unwinding movement of the cord will usually accompany a serious fall by the workman. However, there may be circumstances under which the speed of the unwinding movement of the cord has increased slowly so that the acceleration created by an actual fall is not sufficient to effect a braking action. Accordingly, a response to a particular speed may be desirable in the safety device.

Detailed construction

The cord reel assembly 10 (FIGURES 2, 3 and 4), which has been selected to illustrate a preferred embodiment of the invention, is comprised of a reel casing 11 within which a drum 12 is rotatably supported upon the shaft 13, which is secured to and extends between the side walls 14 and 15 of the casing 11. Secured to the top of the peripheral wall 19 on the casing 11 is a lug 18 which can be pivotally secured to a hook or hanger 22. The peripheral wall 19 has an integral, downwardly projecting pipe 23 of relatively short extent defining an outlet opening 24 in said casing 11.

The drum 12 (FIGURES 2 and 3) has a cylindrical wall 27 and a pair of spaced, substantially parallel end walls which extend radially outwardly from the cylindrical wall and define therewith an annular channel 32 within which a cord 33 is coiled. A spring 34, which encircles the shaft 13 (FIGURE 2) is connected at its inner end to the shaft 13 and at its outer end to the inner surface of the cylindrical wall 27 on the drum 12. The spring 34 is arranged so that rotation of the drum 12 toward the outlet pipe 23, which is in a clockwise direction as appearing in FIGURE 2, results in a tightening of the spring 34 upon the shaft 13. The cord 33 extends from the drum 12 downwardly through the outlet opening 24 in the pipe 23. Rollers 36 may be mounted within the pipe 23 for guiding the cord 33 through the outlet opening 24.

The end walls 28 and 29 of the drum 12 have peripheral edges 37 and 38 which are similarly notched or distorted to provide a plurality of smoothly connected scallops 41 which are preferably uniformly spaced along said edges. The scallops on one edge are preferably aligned, axially of the two end walls 28 and 29, with the scallops on the other edge.

An arcuate brake arm 42 (FIGURES 3 and 4) is pivotally supported between the ends thereof upon and between a pair of pivot ears 43 and 44 by the pivot pin 45. The ears 43 and 44 are rigidly secured to the casing 11, as by being welded to the inner surface of the peripheral wall 19. The pivot ears 43 and 44 are spaced from the pipe 23, in the unwinding direction of rotation of the drum 12, so that the cord-engaging end 46 of the arm 42 extends partially across the outlet opening 24. The cord end 46 of the arm 42 is preferably substantially wider than the central portion of the arm and is bifurcated to provide a pair of coextensive and integral support elements 47 and 48 upon and between which a concave roller 49 is rotatably supported by the shaft 52.

The cord end 46 of the arm 42 (FIGURE 2) is preferably, but not necessarily, bent downwardly to place the roller 49 as far below the pivot pin 45 as conveniently possible. However, the roller 49 must at all times be far enough from the outlet opening 24 that the roller 49 will always be positively engaged by the cord 23 during movement thereof outwardly through the opening 24.

The brake end 53 of the arm 42 (FIGURES 2 and 4) is also substantially wider than the central portion of the arm and has an integral, radially inwardly projecting flange 54 which extends beyond both axial ends of the drum 12 and is engageable with the scalloped edges 37 and 38 of the end walls 28 and 29. The pivot pin 45 for the brake arm 42 is preferably substantially closer to the brake end 53 thereof in order to provide a mechanical advantage. A leaf spring 56 is secured to the outer surface of the brake arm 42 near the cord end 46 thereof (FIGURE 2) and is engageable with the inner surface of the peripheral wall 19 for resiliently resisting downward movement of the cord end 46 of the arm 42. The force, which must normally be applied to the cord 33 to move it outwardly past and over the roller 36, will not cause a sufficient flexion of the leaf spring 56 to effect an engagement of the scalloped edges 37 and 39 by the flange 54. However, an abrupt downward movement of the cord 33, or a sudden and substantial acceleration in the movement of the cord away from the reel 10, will apply to the cord end 46 of the arm 42 a force which overpowers and flexes the spring 56, thereby effecting engagement of the scalloped edges 38 and 37 by the flange 54.

Operation

In one typical use of the reel assembly 10, the hook 22 is attached to a solid support, such as the peak of a roof R (FIGURE 1), and the cord 33 is secured to means, such as a safety belt B, on a workman W. As the workman moves around the roof in the usual cautious and slow manner, the cord 33 will move inwardly and outwardly through the outlet opening 24 in substantially the same manner as it would with a conventional cord reel having a spring-biased drum. That is, the leaf spring 56 is sufficiently stiff that it will not be overpowered and flexed by the force ordinarily applied to the cord 33 in overcoming the tension of the spring 34. However, if the workman W should suddenly slip and fall away from the reel assembly 10 at a rate which, if uncontrolled, would injure the workman, the brake arm 42 is immediately operated. That is, the abrupt movement of the cord 33 away from the reel assembly will impose a sufficient downward force upon the roller 49 that the leaf spring 56 will be flexed, thereby permitting the arm 42 to pivot into a position where the flange 54 will engage the scalloped edges 37 and 38 of the drum 12. Such engagement will promptly and positively retard and then stop rotation of the drum 12 in the unwinding direction.

The initial engagement of the flange 54 with the drum 12 ordinarily results from the inertia of the drum 12 which resists a sudden increase in rotational speed when such increase is demanded by an abrupt downward movement of the cord 33. That is, the resistance of the drum to rotation creates a force having a component which is applied by the cord 33 to the roller 49 in a substantially downward direction, and thereby pivots the arm 42 so that the flange 54 engages the drum 12. The sensitivity of the braking action produced by the arm 42 can be increased by providing a control device, not shown, which is adjustably responsive to a selected rotational velocity or acceleration of the drum 12 for imposing a drag upon the drum when such velocities and accelerations are reached.

Whether the resistance to sudden movement of the cord is provided by the inertia of the drum or the inertia plus a separate drag mechanism, the braking action of the arm 42 becomes substantially self-energizing after it is once initiated. That is, as soon as the flange 54 engages the scalloped edges of the drum 12, it immediately imposes a drag upon the rotation of the drum and, accordingly, resists the unwinding movement of the cord 33. Assuming that the force causing such unwinding is continuously applied to the cord, the drag created by the flange 54 increases the component of force applied to the roller 49, thereby causing the flange 54 to engage with greater pressure the scalloped edges of the drum. It will be seen that this effect is cumulative and will promptly result in locking the drum 12 against rotation.

The locked condition of the drum will continue as long as the tension is maintained upon the cord 33. The force, which is required to keep the leaf spring 56 flexed, will normally be substantially less than the force required to hold the tension upon the cord between the workman W and the reel assembly. Thus, the workman can, while holding firmly onto the cord 33 to maintain such tension, regain his balance upon the roof or other work place. Thereafter, the tension is released on the cord 33, whereby the brake arm 42 is permitted to move back into its position of disengagement from the drum 12 by the urging of the spring 56. Because of the angular relationship between the direction of the force required to unwind the cord 33 and the force component effecting downward movement of the roller 49, the force required to hold the arm 42 in its locked position may be just a fraction of the force which must be applied to the cord to effect such locking and which, therefore, can be applied to the cord to unwind it, providing the force is not applied abruptly.

It will be seen from the above that, if a workman suddenly realizes that he is losing his balance or is likely to slip, he can seize and pull the cord 33 sufficiently to cause the above-described locking action to be initiated and completed. Then, while maintaining a tension upon the cord 33, the workman can right himself without actually falling or completely losing his balance. That is, the sudden seizing and jerking upon the cord 33 will produce the same locking effect as though the workman had actually fallen and was sliding away from the reel assembly.

The alternate construction shown in FIGURE 5 differs from the reel assembly 10 primarily in that the brake arm 61 is located upon the opposite side of the outlet opening 62 from the location of the brake arm 42. Accordingly, as the cord 63 moves outwardly through the opening 62, it moves past the brake arm 61 toward the opening 62. It will be observed that in the reel assembly 10, the peripheral surface of the drum 12 is moving away from the outlet opening 24 as the cord 33 moves through the outlet opening 24. Accordingly, in the alternate assembly 60, the point at which the cord 63 moves away from its contact with the drum 64 is substantially closer to the brake arm 61 than the corresponding point on the cord 33 is to the brake arm 42. Under some circumstances, the arrangement in the alternate assembly 60 can be utilized to provide a more sensitive braking action by the brake arm 61 than can be effected by the brake arm 42. However, aside from this difference in sensitivity, the remainder of the operation of the alternate assembly 60 is substantially identical with the above-described operation of the reel assembly 10.

Although particular preferred embodiments of the invention have been disclosed in detail above for illustrative purposes, it will be understood that variations or modifications of such disclosure, which lie within the scope of the appended claims, are fully contemplated.

What is claimed is:

1. A safety device, comprising: a cord reel including a casing having a peripheral wall and a tangentially disposed outlet opening in the peripheral wall, and a spring-biased drum rotatably supported in said casing; an arcuate brake arm substantially concentrically disposed within said casing between said wall and said drum; pivot means on said wall pivotally secured to said arm between the ends thereof, one end of said arm extending across said outlet opening; a cord secured at one end to said drum and engageable with said one end of said arm when said cord is pulled outwardly through said opening; means defining an irregular surface along the peripheral edge of said drum; drag means on the other end of said brake arm engageable with said irregular surface; resilient means associated with said arm and said casing for resiliently urging said drag means away from said irregular surface, engagement between said drag means and said irregular surface being effected to oppose rotation of said drum in response to an abnormal outward movement of said cord past said one end of said arm.

2. Structure of claim 1 wherein said arm has a roller rotatably mounted upon said one end thereof and engageable by said cord, the pivot axis of said arm being substantially closer to the drag means than to the roller; and wherein said resilient means is a leaf spring connected to one of said arm and the peripheral wall of said casing between said roller and the pivotal axis of said arm.

3. The structure of claim 1 wherein said irregular surface on said drum consists of uniformly spaced, smoothly curved scallops in the radial edges of said drum, and said drag means is a flange on said arm engageable with said scallops.

4. A safety device, comprising: a portable cord reel casing having a peripheral wall with an outlet opening through the peripheral wall; a drum rotatably supported within said casing, and first resilient means urging unidirectional rotation of said drum with respect to said casing; an arcuate brake arm disposed within said casing substantially concentrically with respect to the rotational axis of said drum and adjacent the periphery thereof; pivot means mounted upon and within said casing, said arm being pivotally secured to said pivot means at a point on said arm spaced from the ends thereof, one end of said arm extending at least partially across said outlet opening; a cord secured at one end to said drum and extending through said outlet opening, said cord being engageable with said one end of said arm when said cord is moved through said opening away from said drum; means defining a concentric drag surface on said drum adjacent the peripheral edge thereof; drag means on the other end of said brake arm engageable with said drag surface for arresting relative movement therebetween; second resilient means associated with said arm and said casing for resiliently and continuously urging said drag means away from said drag surface, engagement between said drag means and said drag surface being effected to stop rotation of said drum when the rotational movement of said drum, in response to the outward movement of said cord through said outlet opening, exceeds a selected rate of acceleration which is materially greater than that required to effect normal unwinding of said cord from said drum; and anchor means secured to said casing near the part thereof which is diametrically opposite said outlet opening.

References Cited in the file of this patent

UNITED STATES PATENTS

| | | |
|---|---|---|
| 324,724 | Petersen | Aug. 18, 1885 |
| 635,524 | Terdoest | Oct. 24, 1899 |
| 643,286 | Feiker | Feb. 13, 1900 |
| 973,014 | Doolittle | Oct. 18, 1910 |
| 2,393,511 | Beede | Jan. 22, 1946 |
| 2,543,176 | Komassa | Feb. 27, 1951 |
| 2,586,386 | Ryan | Feb. 19, 1952 |

FOREIGN PATENTS

| | | |
|---|---|---|
| 125,997 | Germany | Dec. 5, 1901 |